US011121738B2

(12) United States Patent
Macleod (10) Patent No.: US 11,121,738 B2
(45) Date of Patent: Sep. 14, 2021

(54) RADIO RECEIVER

(71) Applicant: QINETIQ LIMITED, Farnborough (GB)

(72) Inventor: Malcolm David Macleod, Worcestershire (GB)

(73) Assignee: QINETIQ LIMITED, Hampshire (GB)

( * ) Notice: Subject to any disclaimer, the term of this patent is extended or adjusted under 35 U.S.C. 154(b) by 0 days.

(21) Appl. No.: 17/052,219

(22) PCT Filed: Jun. 4, 2019

(86) PCT No.: PCT/EP2019/064467
§ 371 (c)(1),
(2) Date: Nov. 2, 2020

(87) PCT Pub. No.: WO2019/234009
PCT Pub. Date: Dec. 12, 2019

(65) Prior Publication Data
US 2021/0242899 A1    Aug. 5, 2021

(30) Foreign Application Priority Data

Jun. 7, 2018  (GB) ..................................... 1809386

(51) Int. Cl.
*G01S 19/30* (2010.01)
*H04B 1/7085* (2011.01)
*G01S 19/24* (2010.01)

(52) U.S. Cl.
CPC .......... *H04B 1/7085* (2013.01); *G01S 19/243* (2013.01); *G01S 19/30* (2013.01)

(58) Field of Classification Search
CPC ...... H04B 1/7085; G01S 19/30; G01S 19/243
See application file for complete search history.

(56) References Cited

U.S. PATENT DOCUMENTS 6,493,378 B1 * 12/2002 Zhodzishsky ........... G01S 19/22
                                                            375/149
8,588,278 B2    11/2013 Martin
(Continued)

FOREIGN PATENT DOCUMENTS

EP      2 221 628 B1     5/2012
WO   2006/027004 A1     3/2006
(Continued)

OTHER PUBLICATIONS

Oct. 11, 2019 International Search Report issued in International Patent Application No. PCT/EP2019/064467.
(Continued)

*Primary Examiner* — Dac V Ha
(74) *Attorney, Agent, or Firm* — Oliff PLC (57) ABSTRACT

A radio receiver includes a downconverter for downconverting dual sideband signals such as Binary Offset Carrier (BOC) signals from multiple sources to produce an upper and a lower sideband signal, and chip-matched filters for filtering each of the sideband signals. The output of each filter is provided to a series of separate channels, one for each source, where there are at least Early, Prompt and Late gates. Each gate has a nearest-neighbour sampler and a multiplier for multiplying with an appropriate part of a spreading code, a mixer for removing Doppler or other frequency offsets and an integrator. The invention provides a means for demodulating signals such as BOC modulated satellite navigation signals in an efficient manner by using a single downconverter for the received signals of interest from the multiple sources.

13 Claims, 4 Drawing Sheets

(56) References Cited

U.S. PATENT DOCUMENTS

| | | | |
|---|---|---|---|
| 10,754,043 B2* | 8/2020 | Zhu | G01S 19/30 |
| 2005/0281325 A1 | 12/2005 | Lillo et al. | |
| 2010/0254439 A1 | 10/2010 | Martin | |
| 2011/0169689 A1* | 7/2011 | Wang | G01S 19/26 |
| | | | 342/357.3 |
| 2016/0269073 A1* | 9/2016 | Chae | H04B 1/70752 |

FOREIGN PATENT DOCUMENTS

| | | |
|---|---|---|
| WO | 2010/102331 A1 | 9/2010 |
| WO | 2015/105544 A1 | 7/2015 |
| WO | 2015/107111 A1 | 7/2015 |
| WO | 2016/041493 A1 | 3/2016 |

OTHER PUBLICATIONS

Oct. 11, 2019 Written Opinion issued in International Patent Application No. PCT/EP2019/064467.

M.K. Sust et al., "Rapid Acquisition Concept for Voice Activated CDMA Communication" IEEE, pp. 1820-1826, 1990.

Dec. 7, 2018 British Search Report issued in British Patent Application No. 1809386.4.

* cited by examiner

RADIO RECEIVER

The present invention relates to radio receivers, and more specifically to receivers adapted to receive signals from multiple different sources simultaneously, all sharing the same frequency band or bands. Such receivers are typically used in applications such as satellite navigation.

There are a number of Global Navigation Satellite Systems (GNSS) currently in use, or in a late development or implementation phase. The earliest was the US Global Positioning System (GPS), which was followed by the Russian GLONASS system. At the time of writing, the European Galileo system is almost ready to go into service and has several in-service satellites in orbit. Each of these systems use a Direct Sequence Spread Spectrum (DS-SS) data transmission scheme, whereby different satellites continuously transmit data across one or more relatively wide bandwidths, that are shared with all other satellites in the system (and sometimes with other systems too). To allow a receiver to identify signals from a given satellite, each satellite broadcasts a unique, known (to the receiver) code. The receiver implements a correlation process, whereby it correlates an incoming signal (which is a superposition of the codes being transmitted by all active satellites in the system) and with an internally held copy of the code from the satellite it is searching for. If the signal is present, it will, in a properly functioning system, be separable, due to the correlation gain, from the other signals being transmitted by the other satellites, and from thermal noise, and the receiver will be able to process data encoded e.g. in the phase of the code.

The receiver implements this correlation process in parallel for a plurality of different satellite signals (typically at least 4 or 5, and more typically up to around 10 or 12 or so) and from this information it is able to assemble a navigation message, and calculate a position on the earth and the current time.

Whereas some of the GNSS systems currently use a binary phase shift keying modulation scheme (BPSK), the Galileo network instead uses (for spectrum occupancy reasons) a Binary Offset Carrier (BOC) modulation, which takes a BPSK signal (i.e. the spreading code) and modulates this with a square wave sub-carrier to produce a dual sideband signal, before modulating this up to the transmission frequency, where each sideband is effectively a BPSK signal. Other GNSS systems also use some sort of BOC transmission for some of their signals, and more are expected to implement similar schemes in time.

The use of a BOC signal presents a receiver with some complications over a straightforward BPSK signal. One of these is that its autocorrelation function has multiple lobes, rather than a single lobe found with BPSK signals. The multiple lobed structure can make it hard to traverse the correlation function to obtain accurate timing information, and hence an accurate navigational position. This difficulty increases as the ratio of the sub-carrier frequency to the chip rate increases. For certain GNSS services that ratio is one, and in that case various satisfactory solutions exist. However when the ratio is two or more, as it is for the Galileo Public Regulated Service, the problem caused by the multi-lobed autocorrelation function is substantial. A solution to this problem can be found in International patent publication number WO2015/107111, (111) filed by QinetiQ Ltd and hereby included by reference, where the use of a chip matched filter, followed by a nearest-neighbour sampling process (using a sample selection unit) is used before carrying out the correlation process mentioned above. This approach is efficient computationally, but can in some circumstances have a loss factor (i.e. a reduction in the system signal to noise ratio beyond a theoretic maximum) that is greater than desired.

US Patent application US2010/0254439 ('439), from Thales discloses a system and process for demodulating BOC signals.

It is an object of the present invention to provide a more efficient, or an alternative receiver for the reception and processing of dual sideband signals as used in applications such as GNSS.

According to a first aspect of the present invention there is provided a radio receiver for processing a plurality of signals of interest, transmitted by different transmitters and received by an antenna, all occupying the same shared frequency band or bands, and each signal having a separate spreading code applied thereto, and comprising of an upper and lower sideband, the receiver comprising:

a) a downconverter for downconverting each sideband of all the received signals to a nominal baseband frequency, to produce a combined upper sideband signal, and a combined lower sideband signal;

b) a first chip matched filter for processing the combined upper sideband signal, and a second chip matched filter for processing signals of the combined lower sideband signal, wherein the chip matched filters are matched to a chip of the spreading code as it appears following downconversion of the signals to the respective upper or lower sideband;

c) a plurality of channels, one for each received signal of interest, each channel adapted to receive the outputs from the first and second chip matched filters;

wherein each sideband of each channel comprises at least three gates, comprising of at least an Early, a Prompt, and a Late gate;

and within each gate there comprises:

i) a nearest-neighbour sampler for sampling the signal from the chip matched filter, using an Early, Late or Prompt timing reference as appropriate;

ii) a multiplier for multiplying the samples from (i) with an appropriate part of a local copy of the spreading code, from a spreading code generator;

iii) a mixer for multiplying the signal within the gate by a feedback loop signal for removal of Doppler frequency or local oscillator offsets present on the sideband, the mixer being driven by a numerically controlled oscillator;

iv) an integrator for integrating a gate signal produced from steps (i-iii);

wherein a feedback signal derived from a combination of outputs of the Early and Late gates is used to drive a numerically controlled oscillator which in turn controls the timing of the nearest-neighbour sampler, and the feedback loop signals in (iii) are derived from the outputs of the Prompt gate.

A receiver according to embodiments of the invention can process incoming signals particularly efficiently. The incoming signal is typically digitised at a high frequency compared to the bandwidth of the signal of interest. Thus, in the case of a Galileo navigational signal, it may be digitised at between 50 and 100 MHz.

In a GNSS system, each channel is associated with the received signal from a single satellite. Thus, the number of channels will generally comprise of the maximum number of satellites likely to be visible to the receiver at a given time.

Embodiments of the invention have significant benefits over the '439 disclosure. In the receiver described there, each channel (corresponding to the circuitry required to process signals from a single satellite) requires its own downconverter, that is driven by a numerically controlled oscillator (NCO) controlled by a feedback loop from one or more outputs of the channel.

In contrast, in embodiments of the present invention, a single downconverter (to a nominal baseband signal) for each sideband is used, where the output of the downconverter is shared between all channels. Only a single NCO is needed, as the signals to each downconverter are complex conjugates of each other. This simplifies the hardware and reduces channel complexity, leading to a saving in power and hardware cost. It will be understood by the normally skilled person that the spreading code comprises of a sequence of chips. In downconverting each sideband of the received signals to a nominal baseband frequency, the form of each chip will be changed from that as originally transmitted. For example in the case of a wideband BOC signal the form of each chip in each sideband will be approximately rectangular, as in a conventional GNSS BPSK signal.

As is explained in the '111 patent referenced above, the chip matched filter may be a matched filter, matched to the chip being received at the filter. The use of matched filters is commonplace in sophisticated receiver systems, a matched filter being a filter whose impulse response is the time reverse of the known signal. Such a filter is very difficult to implement in analogue technology for typical DS-SS signals. However, the implementation of a Matched Filter for signals of the type considered here can be simplified by taking account of the fact that the wanted signal is a sequence of identical pulses. It can then be shown that a Matched Filter could in theory be implemented by first filtering the received signal using a filter matched to a single pulse and then sampling the output of that filter and correlating it with the known reference sequence, the spacing of samples into the correlator being one per chip. It is not possible to implement such an initial filter exactly (because of the rectangular shape of its required impulse response) but a close approximation can be implemented, this being a chip matched filter.

The chip matched filter operating on each sideband is shared for all channels, again resulting in lower complexity and power requirements. Thus, in the case of a Galileo PRS signal, just two chip matched filters are required for all signals, one for each sideband. The impulse response of the chip matched filter is matched to the expected chip characteristics of the spreading code as it appears in the downconverted signal. In each sideband the required impulse response may be closely approximated as a rectangular pulse.

The output of each CMF is provided to a plurality of channels, where a channel comprises of the components used to process the signal from a single satellite. Each channel processes the upper and lower sideband signals from respective CMF outputs. Within a channel, the CMF output for a given sideband is supplied to a plurality of gates. There are typically three gates within a channel on each sideband (generally being Early, Prompt and Late gates), although some embodiments may have more. Within each gate, the CMF signal is supplied to a nearest-neighbour sampler.

The nearest-neighbour sampler for each gate comprises of a sample selection unit, arranged to receive sample outputs from the chip matched filter and to select as an output a sample that is nearest in time to a desired ideal time in relation to a timing reference point. Typically the incoming samples are arriving at a rate on average of between 4 and 32 samples per chip (i.e. the duration of a chip of the spreading, or reference code). However, the incoming rate of samples is arranged to have a non-integer number of samples per chip, so that the benefits of nearest-neighbour sampling, as described in '111, are achieved.

The output from the nearest neighbour sampler preferably comprises of a single sample output for subsequent multiplication with a single chip of the spreading code copy, or reference code, stored within each channel, which, when the signal has been acquired, is in synchronisation with the incoming signal.

It will be appreciated by those normally skilled in the art that in BOC signals used in GNSS systems the upper sidebands of all channels occupy a first frequency band, and the lower sidebands of all channels occupy a second frequency band.

The invention is particularly suited to applications where a wideband BOC signal is used, such as the Galileo BOC (15,2.5) PRS signal, where the centre of the upper sideband is separated by approximately 30 MHz from the centre of the lower sideband. Thus, advantageously, the receiver is adapted to process BOC signals occupying two discrete frequency bands.

In a GNSS receiver designed for a BPSK signal there is typically a Prompt correlator whose timing is adjusted by a feedback process called a Tracking Loop, to align it as nearly as possible to that of the timing of the ranging code chips in the incoming signal. The output of the Prompt correlator then provides the best possible values for the receiver to decode the message data contained in the received signal. A "delay" (or "code") tracking loop uses the outputs of further correlators (typically two, known as "Early" and "Late" gates) to perform this time alignment. A further "carrier" tracking loop uses measurements from the Prompt correlator to bring its phase to a desired value.

Where the two sidebands of a BOC signal are separately processed, it is desirable to combine the information from both sidebands since it increases performance (for example it makes tracking more accurate and reduces the probability of error in decoding messages. Therefore these correlation functions (such as Prompt, Early and Late) are applied to both sidebands separately. However it is well known that there are difficulties in the subsequent combining process—one method for which is disclosed in the '439 patent. A small error in the timing alignment of the Prompt correlations relative to the incoming signal causes a phase difference to arise between the complex Prompt correlation outputs from the two sidebands. This phase difference is on one hand useful as a measurement of the delay error, but on the other hand it means that the Prompt correlation outputs from the two sidebands cannot be combined simply by adding them together.

In typical delay tracking loops in BPSK receivers it is the modulus (that is, absolute value) of the Early and Late gate outputs which is used. For example, a common way to process the Early (E) and Late (L) gate outputs in a BPSK receiver is to produce a signal for driving a code NCO derived from the equation $$\frac{|E| - |L|}{|E| + |L|}$$

where |x| refers to the absolute value of x, and is a method which may be used in embodiments of the present invention. (This equation is known as a "delay discriminator"). It is only one example of a delay discriminator. It will be appreciated by those normally skilled in the art that other equations may be used and that further correlator gates (additional to E and L, and for example referred to as Very Early and Very Late) might be implemented, and their outputs used in such an equation.

Conveniently, the receiver may, in some embodiments of the invention, be arranged to use a single feedback signal to drive the code NCOs (otherwise known as code delay NCOs) for both of the sidebands on a given channel. This is because the timing difference between the two sidebands is small, so any errors will not tend to be significant. To generate a combined measurement of code delay error from both sidebands in this case the receiver may sum, for each channel, the moduli (absolute values) of the Early integrator outputs of each sideband (i.e. $|E_U|+|E_L|$), and to sum the moduli of the Late integrator outputs (i.e. $|L_U|+|L_L|$), and to produce a signal for driving a code NCO associated with the nearest-neighbour sampler (i.e. delay) and ranging code generator derived from the equation:

$$\frac{(|E_U|+|E_L|)-(|L_U|+|L_L|)}{(|E_U|+|E_L|)+(|L_U|+|L_L|)}.$$

Alternatively, different feedback signals may be used in some embodiments, where the two feedback signals are derived by applying code delay tracking loops both to the average code delay of the two sidebands and to the code delay difference between the two sidebands.

Other embodiments may employ different feedback signals for driving the code NCO. It is noted that the prior art document from Thales, cited above, appears to have a requirement whereby the code signal used to drive its code NCO is derived from a phase difference between Prompt correlator outputs of each of the sidebands of a given channel. Such a contribution to the code NCO drive signal is not required in embodiments of the present invention.

A feedback signal derived from one or more outputs of the correlators for each sideband may be used to drive the carrier NCO of the channel sideband. This may be combined with a signal from the other sideband. Conveniently, in some embodiments of the invention, for each channel, a first signal is generated comprising the average of the arc tangents of the Prompt integrators for each sideband, and a second signal is generated comprising the semi-difference of the arc-tangents of the Prompt integrators for each sideband, the first signal is filtered using a carrier loop filter, and the second signal filtered using a phase difference loop filter, and the sum of the first and second filtered signals is used to drive the carrier NCO on one sideband, and the difference of the first and second filtered signals is used to drive the carrier NCO on the other sideband. The feedback signals may drive a phase or frequency locked loop. The skilled person will appreciate that other methods for combining the respective sideband and gate signals may be used.

As is said above, no feedback loop is required for the initial downconversion of the received signals to a nominal baseband, unlike with the stated prior art. Preferably therefore, in at least some embodiments of the invention, the downconversion to baseband in step (a) is not driven by a feedback loop from the channels. The downconversion frequency may be (and in general will be) subject to errors such as not being in perfect frequency synchronisation with the transmitted signal, which leads to a small frequency offset being present on the baseband signal (hence the use of the term nominal baseband). There will also be frequency offsets due to relative movement of the receiver with the satellite (or other) transmitters causing an unknown Doppler shift on the received signals. However, the size of these combined frequency offsets is relatively small, and does not present a problem for the novel receiver architecture presented herein.

The invention as described above relates mainly to its operation whilst one or more signals from transmitters are being tracked. Before a signal can be tracked, there is a requirement for a receiver to first acquire the signal (i.e. to establish the current temporal location within the spreading code, or any frequency hopping sequence that may have been applied).

Before acquisition has been performed, the receiver will not know the time of arrival of the received signal. In some applications, there will also be other issues that complicate reception further. Doppler frequency changes in the received signals, caused by relative movement of the receiver or the transmitter are one such issue. "Doppler-like" frequency errors caused by imperfections in the receiver local oscillator (LO) are another. The acquisition process therefore comprises of a search, across time and, in some applications frequency (due to the Doppler variations), for the wanted signal. This is usually done using a correlation process, where the received signal is correlated with the local copies of the known signal (the "reference code"). The correlation process during an acquisition phase may use the same correlator components as used during a tracking phase, or alternatively, a separate correlator function may be used for acquisition purposes.

Thus some embodiments of the invention may further comprise an acquisition unit arranged, on each sideband, to split the CMF filtered signal into a plurality of temporal parts, each shorter than a full sequence of the spreading code, and to carry out a sub-correlation with a similar sized part of the local copy of the spreading code, and combining the results of the plurality of sub-correlations in fast Fourier transform or discrete Fourier transform.

The invention is primarily aimed at the processing of signals transmitted by a GNSS system, such as Galileo. Thus, generally, the plurality of signals of interest are those transmitted by the satellites of a GNSS system.

According to a second aspect of the invention there is provided a method of demodulating a plurality of signals of interest, transmitted by different transmitters and received by an antenna, all occupying the same shared frequency band or bands, and each signal having a separate spreading code applied thereto, and comprising of an upper and lower sideband, the method comprising the steps of:
  a) downconverting each sideband of all the received signals to a nominal baseband frequency, to produce a combined upper sideband signal, and a combined lower sideband signal;
  b) filtering the combined upper sideband signal in a first chip matched filter, and the combined lower sideband signal in a second chip matched filter, wherein the chip matched filters are matched to a chip of the spreading code as it appears following downconversion to the respective upper or lower sideband;
  c) providing the filtered upper and lower sideband signals to each of a plurality of channels, one for each received signal of interest, each of the channels being adapted to process both sidebands separately, and wherein each sideband of each channel comprises at least three gates, comprising of at least an Early, a Prompt, and a Late gate;
and within each gate:
i) sampling, using a nearest-neighbour sampler, the signal from the chip matched filter, using an Early, Late or Prompt timing reference as appropriate;
ii) multiplying, using a multiplier, samples from (i) with an appropriate part of a local copy of the spreading code, from a spreading code generator;
iii) multiplying, using a mixer, the signal within the gate by a feedback loop signal for removal of Doppler frequency or local oscillator offsets present on the sideband, the mixer being driven by a numerically controlled oscillator;
iv) integrating, using an integrator, a gate signal produced from steps (i-iii);
wherein a feedback signal derived from a combination of outputs of the Early and Late gates is used to drive a numerically controlled oscillator which in turn controls the timing of the nearest-neighbour sampler, and the feedback loop signals in (iii) are derived from the outputs of the Prompt gates.

The method provides, in embodiments of the invention, an output comprising of information encoded into the originally transmitted signals, which is then used by subsequent processes. Such processes may include, in a GNSS application, the calculation of a navigational position, a velocity, or timing (PVT) information. The calculation of such PVT information is known to the normally skilled person.

According to a further aspect of the present invention there is provided a non-transitory computer-readable medium storing instructions that, when executed by one or more processors, are configured to cause the one or more processors to perform operations comprising the above method.

The processor(s) may be, in some embodiments, digital signal processors, microprocessors, Field Programmable Gate Arrays (FPGAs), Application Specific Integrated Circuits (ASICS) or any other suitable processor, implemented in hardware, software, firmware, or by any other means. The processors may be connected to memory, and be arranged to receive signals from components comprising antenna(s), amplifier(s), mixer(s) etc. as would be understood by the normally skilled person, Embodiments of the invention will now be described in more detail, by way of example only, with reference to the following Figures, of which:

Figure 1:
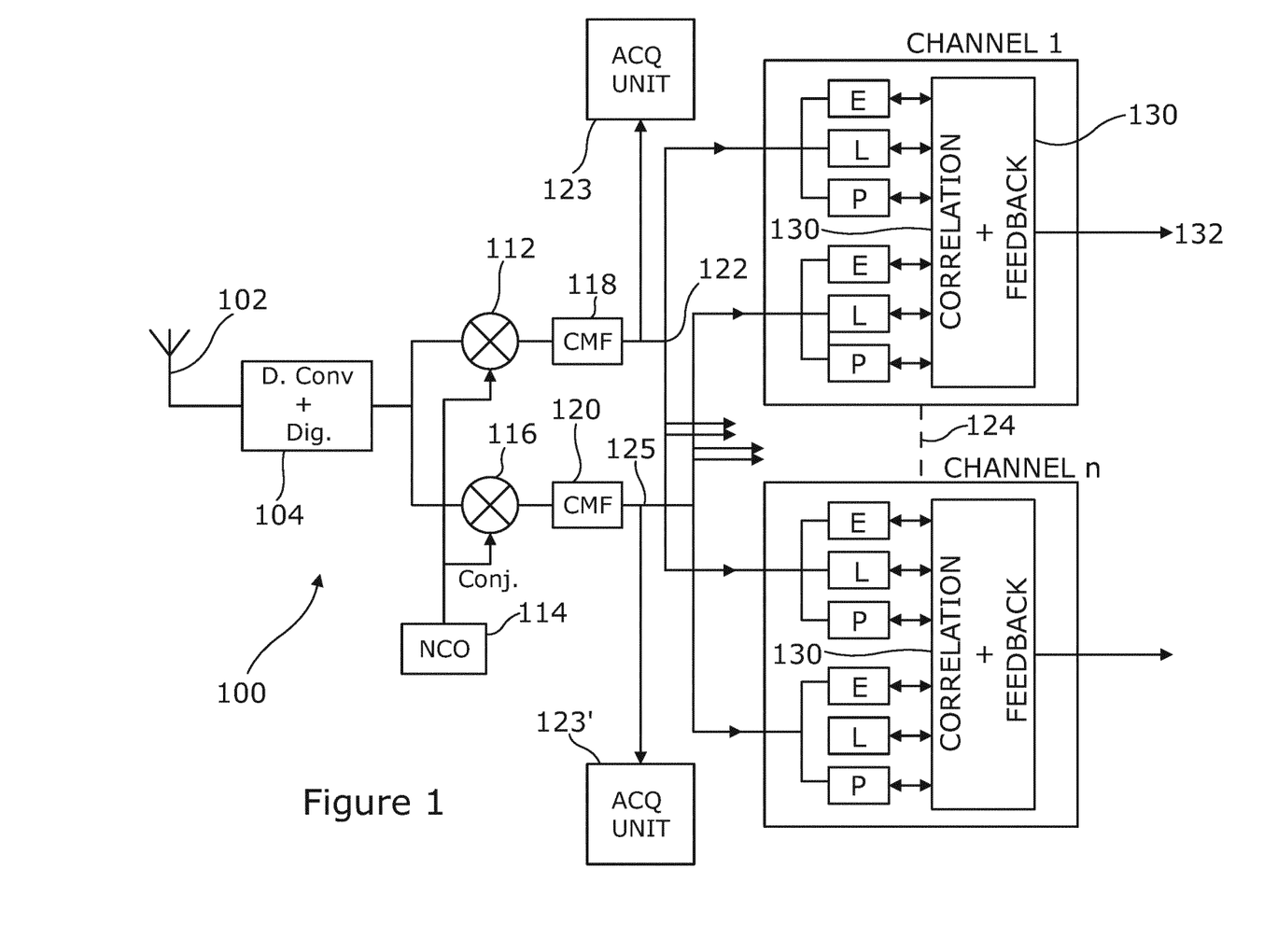
FIG. 1 diagrammatically illustrates a top level architecture of an embodiment of the invention.

FIG. 1 shows the basic architecture of the front end of a receiver according to an embodiment of the present invention. The receiver 100 has an antenna 102 for receiving GNSS signals from a plurality of satellites, such as PRS signals from the Galileo GNSS constellation. The antenna provides its signals (via a low noise amplifier, not shown) to a downconverter and digitisation function 104 which brings the frequency of the signals to a nominal baseband plus the sub-carrier frequencies (approximately 15 MHz in the case of Galileo PRS signals in the E1 band). The downconverter may comprise a multiplier. The output from the downconversion and digitisation function 104 is split into two paths. An upper path 122 handles the upper sideband signals, whilst a lower path 125 handles the lower sideband signals. In the upper path the downconverted upper sideband signals are mixed in mixer 112 with an output from numerically controlled oscillator 114 to bring the signals to nominal baseband, as explained further below. This baseband signal is then filtered in a chip-matched filter 118 before being split into a plurality of signals for processing within the upper sideband processing paths of n individual channels, wherein each channel is arranged to process signals from one satellite. Two channels, i.e. channels 1 and n are shown, with other channels indicated by dotted line 124. The lower path handling the lower sideband chain is, at this level of granularity, functionally identical, and comprises mixer 116, which mixes the incoming signal from unit 104 with a conjugate signal to that used by mixer 112, so as to bring the lower sideband to a nominal baseband. This is filtered by CMF 120, and the output split to feed the lower sideband processing paths of the n channels. Thus a single CMF and mixer are used to process all of the signals of a given sideband.

Each sideband of each channel is split into, in this embodiment, three gates, comprising of an Early (E), a Late (L) and a Prompt (P) gate, for each sideband. Sometimes, some embodiments may have further gates, such as a Very Early and Very Late channels, but these are not considered in detail here. Further processing is carried out within each gate as is explained in more detail in relation to FIG. 2, and the signals from each gate are correlated and processed at 130 to provide output signals 132 both for use in generating a navigation solution, and feedback signals for controlling the gate and channel processing. These various functions and components will now be described further.

Figure 2:
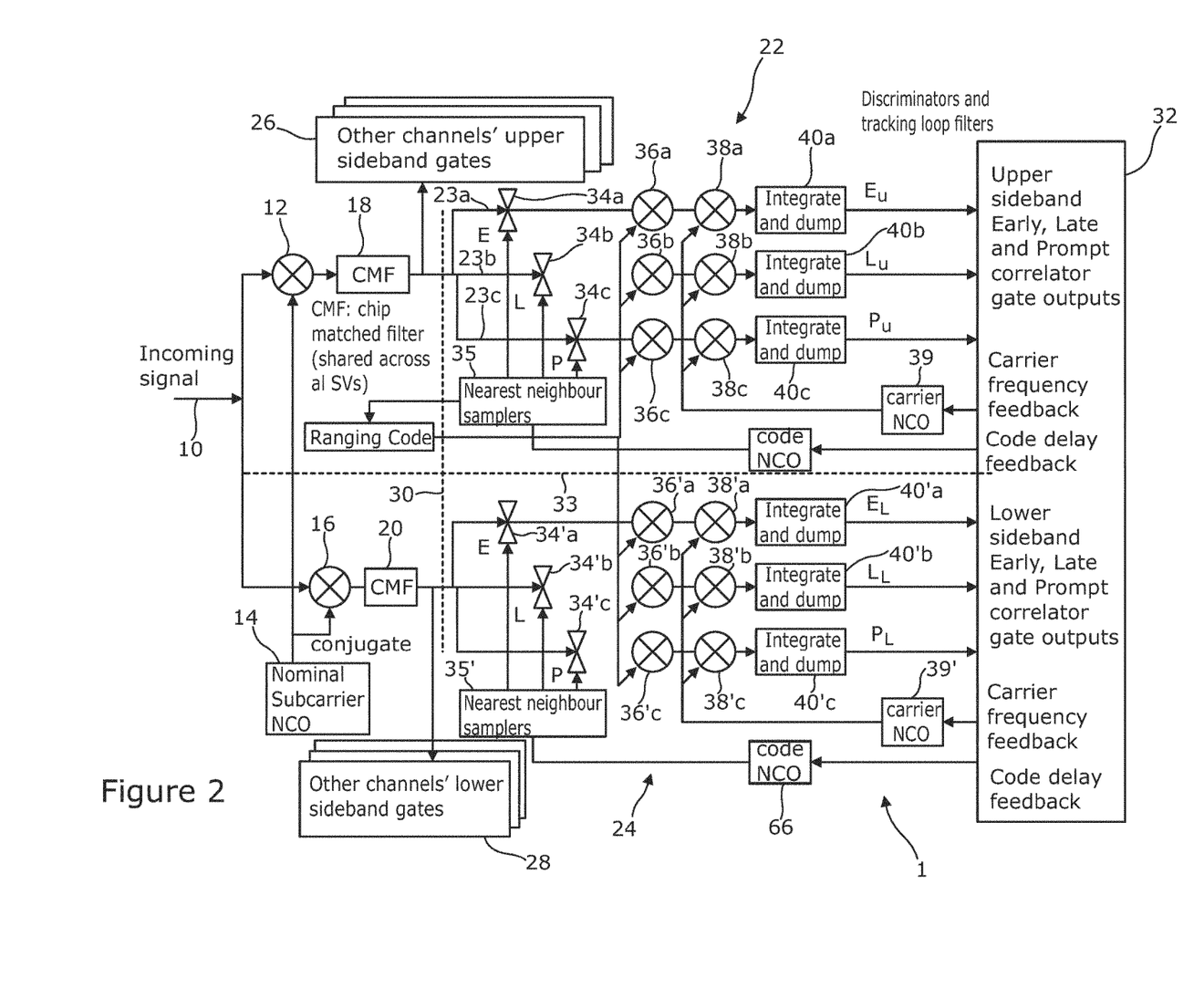
FIG. 2 diagrammatically illustrates a more detailed, but still simplified block diagram of the embodiment of the invention shown in FIG. 1.

Shown in FIG. 2 is a more detailed version of FIG. 1, but which is still a simplified representation 1 of a part of a receiver of an embodiment of the present invention. It assumes that the received signal has been downconverted and digitally sampled as described above, to provide an incoming signal at a nominal sub-carrier frequency. Thus, for a Galileo PRS receiver for example, a received signal from the satellite has a centre frequency of nominally 1.57542 GHz, this being modulated with BOC(15, 2.5) signal, putting each sideband at a nominal sub-carrier frequency of 15.345 MHz. This sub-carrier frequency is presented as I (In-phase) and Q (Quadrature) digital samples, sampled at a rate of typically 60 Msps to the input 10 of the architecture of FIG. 2.

The description assumes that a signal has been acquired, through an acquisition process such as that described later, and hence that the signal is being tracked in a channel.

The signal at the input feeds into a pair of digital mixers, one for each sideband. The upper mixer 12 also has a complex input from an NCO 14 operating at the nominal sub-carrier frequency. The lower mixer 14 has a complex input from the NCO 14 with a conjugate signal to that of the signal feeding the upper mixer. The output of mixer 12 is a signal nominally at baseband that comprises the modulated information present on the upper sideband of the transmitted signal. Likewise, the output of mixer 16 is a signal nominally at baseband that comprises the modulated information present on the lower sideband of the transmitted signal.

There are various things that may prevent the nominal baseband frequency being centred at 0 Hz. These include frequency errors in the sub-carrier NCO, given that the NCO is not controlled by a feedback signal from further correlation elements of the receiver. Any such frequency errors will be minor, given that the NCO may be driven by a system clock typically derived e.g. from a crystal, where the frequency error is well within acceptable limits that won't have a performance effect on subsequent processing. Another frequency error source is that of changes to the received frequency due to the Doppler effect, caused by radial movement, or a changing range, between a given satellite and the receiver. Again, any such frequency errors caused by this do not have a significant impact on subsequent processing. For these reasons the inventor of the present invention has found that, with the proposed architecture, no feedback control of the sub-carrier NCO is needed, and therefore the system requires just a single one covering all satellites.

Each of the outputs from the mixers 12, 16 is fed into respective chip matched filters 18, 20. Each CMF is a matched filter, matched to the expected shape of the chip being received. As is explained in WO2015/107111, the CMF may be implemented as a finite impulse response filter, and, given the nature of the chip signal (being a square wave, or an approximation thereto), can be implemented very efficiently, which, given the relatively high sample rate at this point (typically between 10 MHz and 80 MHz), is useful in reducing power consumption.

Only a single mixer and single CMF is required for handling all signals of a given sideband. The output of each chip matched filter 18, 20 is split up to provide an input signal to a particular sideband's processing chain for each channel. In FIG. 2 the processing chains for the upper and lower sideband of a single channel are shown in detail, with the upper and lower sideband processing chains of other channels indicated at 26 and 28 respectively, and which are functionally identical to the upper 22 and lower 24 sideband processing chains shown in more detail. Each channel comprises of the signal processing dedicated to handling the signals for an individual satellite. Thus, there are as many channels as there are satellites likely (under ideal conditions) to be visible to the receiver at a given instant. There will be, in most embodiments, at least four channels, but will typically be around 12 channels. Each channel comprises of a first processing chain 22 having processing elements for processing the upper sideband signal in three gates ($E_U$, $P_U$ and $L_U$), and a second processing chain 24 having processing elements for processing the lower sideband signal, again in three gates ($E_L$, $P_L$ and $L_L$).

FIG. 2 shows, on the right hand side of dotted line 30 (indicating the split between functionality that is common to all channel on the left thereof, and that used in a single channel on the right thereof) the basic structure of a part of one channel. The gates that together comprise processing elements 22, handling the upper sideband and sitting above dotted line 33, receive an input from the CMF 18 (as do the other upper sideband gates—not shown—in the other channels, as indicated at 26). Within the sideband processing chain, the input splits into the three gates 23a-c, one each for Early, Late and Prompt processing. In each gate a nearest neighbour (N-N) sampler 35 chooses (as explained in WO2015/107111) an input sample from the incoming sample stream (which is still at that point at the sample rate of the input signal supplied to mixer 12) that is, for each of the gates, nearest to an ideal sample time (in relation to a reference point on each chip (such as the start, the middle, or the end of each chip) for the particular gate. Each gate therefore comprises a sample stream following the sampling as indicated at 34a-c at a rate of one sample per chip. It will be understood by a normally skilled person that the E, L and P gates are used to find precise timing of the incoming signal, as is well known in GNSS receiver design. The relative timing between P and E, and L and P generally stays fixed, but the absolute timing is controlled by a code NCO, that forms part of a Delay Locked Loop, as is explained further later.

The output of each N-N sampler 34 is a sample at a rate of one sample per chip, with the remaining samples not being used. This sample is multiplied in multipliers 36a-c by an appropriate ranging (spreading) code chip, whereby the appropriate chip is found through an acquisition process that synchronises the ranging code chip position with the incoming samples, as would be appreciated by a normally skilled person, and is described later. Once synchronised, a clock signal that updates the ranging code chip is taken, in this embodiment, from each operation of the N-N sampler 35. As the ranging code comprises of real-values of +1 or −1, the multipliers are conveniently implemented as switched negators.

Following the ranging code multiplication, a carrier wipeoff is performed, that removes (or at least reduces) the frequency errors discussed above, namely caused by relative movement (Doppler) and by frequency errors in the original signal downconversion process. The carrier wipeoff is implemented by mixing, in mixers 38a-c in each gate, the output of the ranging code multiplier. The carrier wipeoff is driven by a phase locked loop (PLL), in which is a carrier NCO component 39, in a process described more fully later.

It should be noted that the carrier wipe-off and the ranging code multiplication can occur in either order, and embodiments should not be limited to the order mentioned above.

Following this, the signals are integrated in integrators 40 (i.e. summer units) over a suitable timespan (typically such as one or more full repetitions of the code) and the integrated values (dumps) used, as described later, to control the various DLL and PLL loops mentioned above, and also to provide a navigation signal output for further processing. This is indicated as reference 32, and is described in detail below with reference to FIG. 3.

It will be understood that the ranging code multiplication, together with the integrate and dump function constitute a correlator, that correlates the incoming signal with the ranging code to produce correlation values for each of the E, L and P outputs, termed $E_U$, $L_U$ and $P_U$, where U denotes that it's from the upper sideband, and E, L and P are as previously defined.

Processing elements 24, sitting below dotted line 33, handles the lower sideband, and is functionally identical to that of the upper sideband processing elements 22. It receives from mixer 16 the lower sideband signal, following the mixing process with the (conjugate) signal from the sub-carrier NCO 14 as described above. As with the upper sideband, it splits into three gates, comprising E, L and P paths having N-N samplers, carrier wipeoff and correlation functions as described above. The output from the lower sideband 24 correlation process are three outputs, termed $E_L$, $L_L$ and $P_L$, where L denotes an output from the lower sideband processing path correlator. Note that similar reference numerals are used for the components within a channel of both the upper and lower sidebands, but the latter are indicated with a dash, e.g. 34'.

Figure 3:
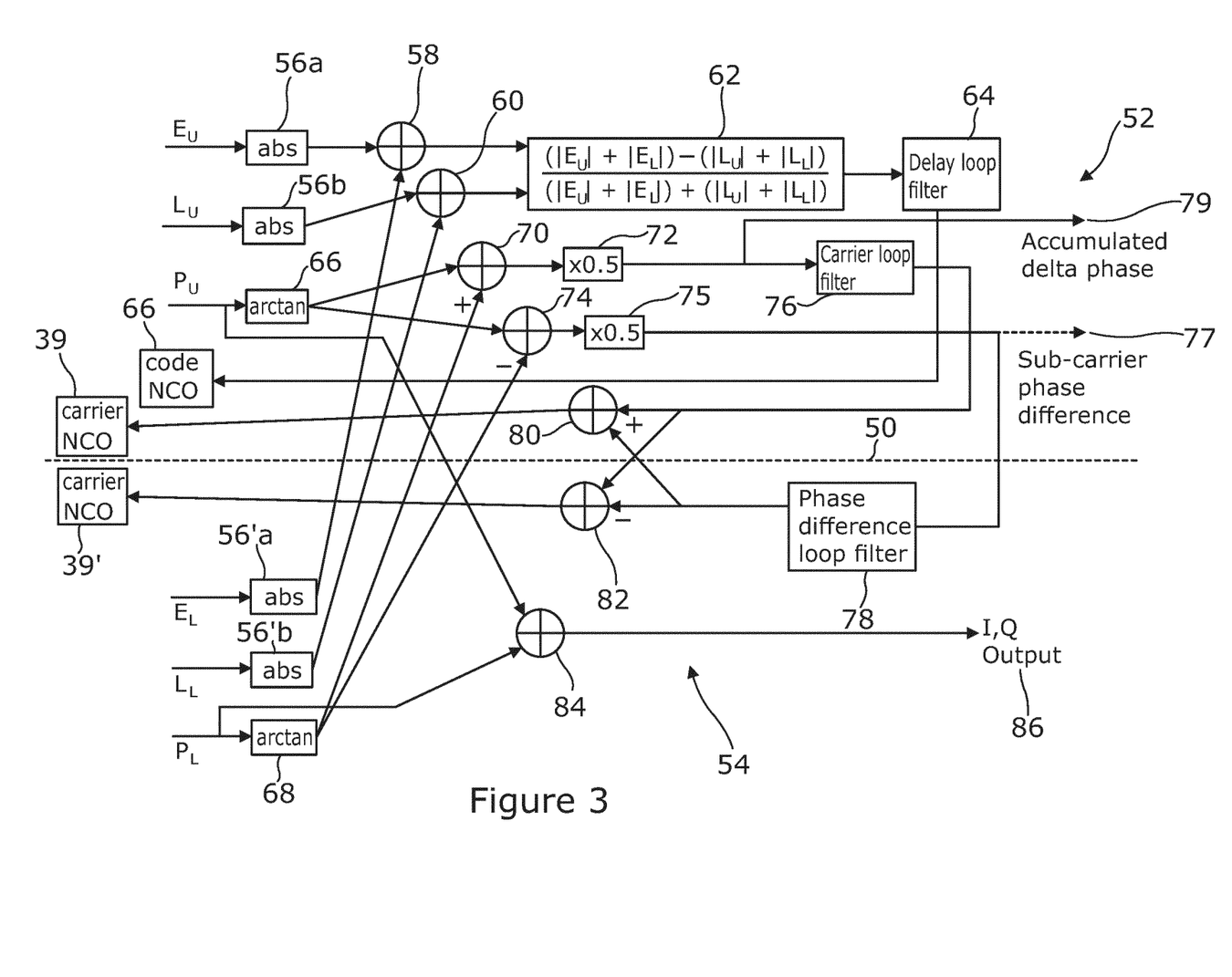
FIG. 3 diagrammatically illustrates a simplified block diagram of a feedback arrangement employed in an embodiment of the invention.

FIG. 3 shows the feedback paths that operate within each channel of an embodiment of the invention. It should be noted that this is merely one way of implementing a feedback arrangement, and that others may also be used, as would be apparent to a normally skilled person. The figure is split by dotted line 50 into the upper sideband feedback processing 52 and the lower sideband feedback processing 54, although signals from both the upper and lower sidebands are used within each part 52, 54, as is described below.

A code NCO delay locked loop is implemented in this embodiment as follows. The absolute values of $E_U$, $L_U$, $E_L$ and $L_L$ are produced, by either passing positive values or negating negative values, as indicated by the abs function 56a-b. The moduli of the $E_U$ and $E_L$ terms are then summed in summer 58, and the $L_U$ and $L_L$ terms are summed in summer 60. A signal comprising of the value of:

$$\frac{|E|-|L|}{|E|+|L|} = \frac{(|E_U|+|E_L|)-(|L_U|+|L_L|)}{(|E_U|+|E_L|)+(|L_U|+|L_L|)} \quad \text{(Eqn 1)}$$

is then computed at 62, with the resulting signal being filtered in DLL filter 64, and the filtered signal being used to drive the code NCO 66. These components thus constitute parts of a code DLL, that tracks the amplitudes of the early and late signals. It will be seen that if |E| (this being the absolute value of $|E_U|+|E_L|$), is greater than |L| (this being the absolute value of $|L_U|+|L_L|$) then the numerator of Eqn 1 is positive, and the DLL will be driven to adjust the timing of the N-N sampler appropriately in a first direction. Conversely, if the numerator of Eqn 1 is negative, the DLL acts to adjust the timing of the N-N sampler in an opposing direction. Eqn 1, and its use within the code DLL thus acts as a delay discriminator and provides to the system an estimation of the delay error, and with the loop, provides means for minimisation of the delay error.

FIG. 3 shows a single code NCO, and hence a single code DLL is used for both the upper and lower sidebands within a channel. The code NCOs 66 shown in FIG. 2 therefore are, in this embodiment, the same NCO, with two being shown only for ease of representation. For an undistorted received signal the delay experienced by both sidebands is the same. Except in the most extreme case of ionospheric distortion, the delay difference between the two sidebands is negligible. This means that it is generally acceptable to make the assumption that the delays are equal. This allows the single code NCO to be used for both the upper and lower sidebands.

It may be the case that in some implementations, for reasons of wishing to use an architecture identical to a BPSK tracking channel (e.g. for application to or compatibility with signals transmitted by other systems), it is desired to retain separate code NCOs for each the two sideband channels. In this case the output of delay loop filter 64 may be used to drive two code NCOs identically, one for each channel, in which case the NCOs 66 in FIG. 2 are then separate NCOs.

A carrier NCO phase locked loop (PLL), for reducing the carrier offset (due, as explained above, to Doppler frequency effects, and frequency errors in the downconversion process) is implemented in this embodiment as follows. In a given channel the arc-tangents of the prompt outputs $U_P$ and $L_P$ are calculated, at 66 and 68. In a first summation unit 70 these arc-tangents are summed, and the result divided by 2, at 72, (i.e. $(\text{Tan}^{-1}(P_u)+\text{Tan}^{-1}(P_L))/2$) to produce the mean arc-tangent. In a second summation unit 74 and divider 75 $(\text{Tan}^{-1}(P_u)-\text{Tan}^{-1}(P_L))/2$ is calculated to produce the mean difference. The mean arc-tangent then goes to carrier loop filter 76, whilst the mean arc-tangent difference is provided to a phase difference loop filter 78. The loop filters 76 and 78 may be arranged to provide the same, or advantageously, different degrees of smoothing to their respective input signals. This is because the variation of the mean arc-tangent is directly proportional to the changing distance between the satellite and the receiver antenna, while the mean arc-tangent difference is proportional to the delay error in the delay tracking loop, which is affected by the dynamical response of the delay locked loop. These signals therefore have different characteristics. The outputs of filters 76 and 78 are summed in summer 80 and fed as an input to upper sideband carrier NCO 39. The difference, calculated in summer 82, between the carrier loop filter 76 and the phase difference loop filter 78 is provided to lower sideband carrier NCO 39'. This provides a carrier discriminator function.

The input to carrier loop filter 76 is also used as a "carrier phase" output 79 for the purpose of computation of Accumulated Delta Phase, as described below.

The $P_U$ and $P_L$ signals from the respective correlators are summed in summation unit 84 to provide I and Q outputs 86 that are used in subsequent navigation message processing.

It will be appreciated that if the carrier phase errors between the upper and lower sidebands within a channel are small, then their average is the "carrier phase error". Their difference is the "subcarrier phase difference". This phase difference is proportional to the delay error of the Prompt correlation gate. It goes through one whole cycle ($2\pi$ radians) as the delay error of the Prompt correlation gate goes through half of one cycle of the BOC subcarrier.

The implementation of the carrier loop feedback as described above computes the values of (a) the "carrier phase" error (also known as the central carrier phase), which is the average of the two subcarrier phase errors, and (b) the "subcarrier phase difference" 77. The "carrier phase" may be used to improve the accuracy of the navigation solution, through the calculation of "accumulated delta phase" 79 or equivalently "accumulated delta range", which is particularly valuable in accurately measuring movements of the receiver during a tracking phase as would be understood by a person of ordinary skill in the art.

Removal of, or compensation for, the central carrier phase and the subcarrier phase difference is also necessary to ensure that the $P_U$ and $P_L$ signals which are summed in summation unit 84 are in-phase with each other, so that the I and Q outputs 86 allow the best possible data demodulation performance to be achieved, in support of subsequent navigation message processing for computing position, velocity and time.

"Subcarrier phase difference" 77 in BOC signal tracking has been used in prior art systems (e.g. in '439) to provide a "Vernier delay" measurement in which a subcarrier phase difference of between $-\pi$ and $\pi$ indicates a Prompt delay error of between $-0.25$ and $+0.25$ subcarrier cycles. This may be used to improve delay measurement accuracy.

However, the nature of BOC modulation, with its characteristic autocorrelation function (as described in the '111 patent application) presents difficulties with this approach. Specifically, once the delay error of Prompt exceeds ±0.25 subcarrier cycles, the subcarrier phase difference "wraps around" (e.g. it is viewed as lying within the range $-0.25$ to $0.25$ cycles relative to a "wrong" position, offset by 0.5 cycles). This is exactly analogous to the ambiguity caused by the BOC autocorrelation function modulus which has peaks at 0.5 cycle intervals.

For this reason, embodiments of the present invention do not use the subcarrier phase difference for delay estimation. It has been realised by the present inventor that:

The BPSK-like correlation function of each sideband channel alone is much wider than the spacing between the multiple BOC peaks, and the time/delay difference between the two sidebands is (as explained earlier) normally negligible. Therefore computing Early and Late gates with the same timing in both sidebands and then combining their outputs incoherently is satisfactory. It is not necessary to have extra delay tracking accuracy provided from the subcarrier phase difference in order to perform Delay Tracking.

Even if a tracker could become locked onto the wrong subpeak (or equivalently, with zero subcarrier phase error, but slightly incorrect delay) this does not significantly degrade demodulation of the BOC signal, in the case when the subpeaks are closely spaced, which is the case of interest here.

If the subcarrier phase difference is used with the intention of improving the delay accuracy (or in carrier aiding) then if the ambiguity is not overcome the delay error may be made worse rather than better. It is hence believed to be better not to use the subcarrier phase difference within the tracking loop, but instead to apply a process, not shown in the figures, which processes the sub-carrier phase difference output shown in FIG. 3 and operates over the longer term to estimate and remove the ambiguity without affecting the delay tracking loop. The resulting disambiguated estimate of the subcarrier phase difference may be combined with the DLL delay estimate for output to the Position, Velocity and Time estimation algorithms in the receiver.

The normally skilled person will appreciate that other implementations of the various feedback loops may be used. The method as described above requires no mixing of the code loop with the carrier loop, as is done in some prior art implementations such as in the '439 document.

One alternative approach is to use independent carrier PLLs (or where appropriate, frequency locked loops—FLLs) on the upper and lower sidebands, rather than the combined approach described above. These would independently keep the two sideband signals phase locked. The data-bearing signal, i.e. the signal transmitted by satellites, comprising information necessary for navigation purposes (which is the same in the two sidebands) could then be extracted from each, and then averaged to improve the overall data SNR by 3 dB. This loses the ability to calculate the carrier phase error using the mean of the subcarrier phase errors as described above however, and so is not preferred.

Before a GNSS receiver can track a signal, it needs to detect the presence of the signal and make an initial estimate of its delay and its frequency offset. As is explained in the '111 patent (and included by reference) this is carried out using an Acquisition Unit, which may be implemented in one of many ways. Embodiments of the present invention may provide for the frequency shifting of each sideband to baseband and the chip matched filtering of each sideband to be shared not only by all tracking channels as already described but also by the Acquisition Unit 123 as shown in FIG. 1.

To explain this, the acquisition process will first be described with relation to BPSK signals, which uses a simpler, but related technique, and then an explanation given on how it is applied with BOC signals Because the relative timing of the reference code with the incoming signal is not known (and also which reference code from those available should be used) and the received signal is buried deep within noise, a correlator may be made to repeatedly correlate the reference code with the incoming signal using different time shifts and reference codes, until (at some sample time, say $m_1$) the magnitude of the correlator output exceeds a predetermined threshold. At this point the reference signal is said to have been detected, and its time of arrival is estimated to be sample time $m_1$).

It is desirable to perform these correlations at as low a rate as possible in order to minimise the computational load of the correlations, and hence power consumption. However, as the rate is reduced, the time spacing between the correlations increases and the maximum possible time difference between the true time of arrival of the signal and one of the actual times at which correlations are computed increases. This causes a performance loss (a reduced probability of detection), the maximum and average values of which increase as the spacing between the correlations increases.

As is well known, the time interval between correlations is therefore typically chosen to be between 0.25 and 0.5 times the chip duration in order to ensure a sufficiently small loss of detection probability. Hence complete correlations must be performed at a rate between 2 and 4 times the chip rate. This is a much greater rate of computation than that in tracking as discussed earlier.

A way to implement this repeated correlation efficiently is to first use the nearest-neighbour sampler to select samples from the Chip Matched Filter output at a mean rate equal to the chosen rate of correlations (for example 2 to 4 times the chip rate) and store those samples in a buffer. Then to perform each correlation, the correlator draws samples from the buffer whose sample times correspond as closely as possible to a spacing of one sample per chip.

As explained above, the received signal may also be shifted in frequency because of Doppler shift or oscillator frequency errors. If this frequency shift is not removed before correlation, then any frequency shift which remains causes the magnitude of the correlation output to be reduced. This causes an additional loss of detection probability. To ensure that that loss does not exceed an acceptable limit, the magnitude of the residual frequency error at the correlator input must be kept below a limit, which may be labelled $f_{LIMIT}$ Hz.

That could be achieved by implementing a multiplicity of paths, with each one having a different frequency offset applied before input to a correlator system as described above. The spacing in frequency between the paths must be no more than $2f_{LIMIT}$ Hz to ensure that in one of the paths the residual frequency error is no more than $f_{LIMIT}$ Hz.

Simply increasing the number of correlators in this way has the undesirable consequence of requiring more computational power, and hence more circuitry and greater electrical power consumption. To avoid these disadvantages, efficient ways to perform the necessary computation have been defined. One such method, which is referred to as "segmented correlation" has been described (under the name "Swivelling Matched Filter") in the paper "Rapid Acquisition Concepts for Voice Activated CDMA Communication" authored by M Sust, R Kaufman, F Molitor and A Bjornstor, published in Globecom 90, pp. 1820-1826, Dec. 1990.

In this method the reference code sequence is divided into M subsections each of length B (where MB should be at least L, the length of the whole reference code sequence). The correlation process (matched to a signal assumed to have zero frequency shift) is then broken into M subcorrelations, each producing one output. Each subcorrelation multiplies only B samples of the input with the corresponding B samples of the reference code.

Figure 4:
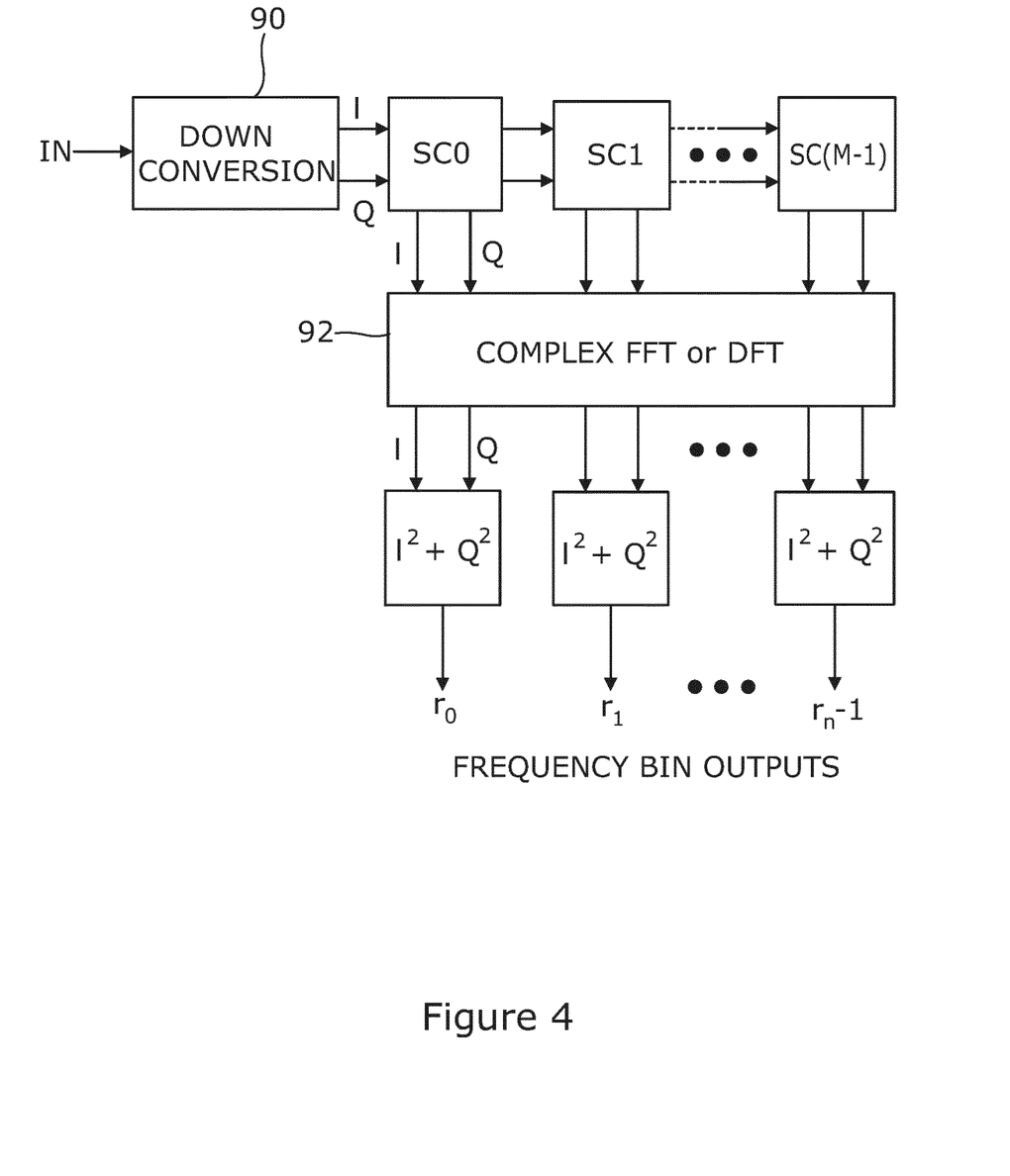
FIG. 4 diagrammatically illustrates one way of acquiring a signal as may be employed in an embodiment of the present invention.

This is illustrated in FIG. 4, which is based upon a figure from the Sust paper. An incoming received signal, is first downconverted and sampled 90, e.g. as described herein. The samples are then applied to the M subcorrelators SC0, SC1 ... SC(M−1), with each subcorrelator providing a complex output. The outputs of the M subcorrelators are then further combined in a combining process 92 labelled "Complex FFT or DFT"

The outputs of the combining process $r_0, r_1 \ldots r_n-1$ are the squared magnitudes of each complex output of the FFT or DFT (that is, $I^2+Q^2$,). The largest squared magnitude at each correlation time is then the compared with a chosen threshold, and if it exceeds the threshold, a detection is declared.

As explained in the Sust et al paper, the outputs from this architecture are approximately equivalent to those from a set of M separate correlators, each having a different frequency shift. $f_A$, where the values of $f_A$ are $$f_{Ak}=k(f_S/MB), \text{ for } k=-M/2, \ldots (M/2)-1 \quad (10)$$

The frequency spacing between these frequency-shifted correlators therefore has the value $f_{STEP}=(f_S/MB)$. This leads to a worst case loss which is typically too great (leading to too great a performance loss). To overcome this problem the function "FFT or DFT" may be replaced by a process named the Discrete Time Fourier Transform (DTFT). In the DTFT, the frequency spacing $f_{STEP}$ between outputs may be chosen arbitrarily; in particular, it may be chosen to be smaller than $(f_S/MB)$, leading to smaller worst case loss of performance. It will be appreciated by the normally skilled person that there are several ways to implement such a DTFT, including the use of a zero-padded FFT, or the use of the CORDIC algorithm.

It would be possible to apply the acquisition techniques described above, in the present invention, to only one of the two sidebands; in other words to use only one of the two CMF outputs in FIG. 1. The acquisition technique would then be exactly as already described. However, using only one of the two sidebands causes a significant performance loss of nearly 3 dB.

To avoid this, in an embodiment of the invention, two copies of the acquisition processing described above are applied, one to the Upper and one to the Lower sideband CMF outputs, and their outputs are combined. In more detail, an Acquisition unit receives the outputs of both CMFs in FIG. 1. Lower and Upper sideband nearest neighbour samplers select samples from the Lower and Upper sideband Chip Matched Filter outputs at the same time instants, and at a mean rate equal to the chosen rate of correlations (for example 2 to 4 times the chip rate), and those samples are stored in two buffers.

The segmented correlation method is in this embodiment applied independently to the contents of the two buffers. As before, it draws samples from the buffer whose sample times correspond as closely as possible to a spacing of one sample per chip. The outputs of the first segmented correlator are complex numbers corresponding to the correlations at different frequency shifts, as described above. Similarly the outputs of the second segmented correlator are complex numbers corresponding to the correlations at different frequency shifts, as described above. But for the reasons already explained in relation to tracking, the argument (i.e. phase) of the corresponding outputs from the two segmented correlators is different.

Therefore the modulus (i.e. absolute value) of each such output is computed. The moduli of the outputs from the first and second correlators at matching frequencies are then summed, to produce a single output for each frequency.

The largest of those summed values is then the compared with a chosen threshold, and if it exceeds the threshold, a detection is declared, and the tracking phase can commence.

The invention may be implemented in in any suitable manner, as would be understood by a person normally skilled in the art. Once the received signals have been digitised, the various functions described herein may be carried out in digital hardware, such as on one or more ASIC chips, in firmware on one or more FPGAs, or in software running on a computer system, e.g. using a general purpose processor or a signal processor, or in a combination of two or more of these.

The invention claimed is:

1. A radio receiver for processing a plurality of signals of interest, transmitted by different transmitters and received by an antenna, all occupying the same shared frequency band or bands, and each signal having a separate spreading code applied thereto, and comprising of an upper and lower sideband, the receiver comprising:
   a) a downconverter for downconverting each sideband of all the received signals to a nominal baseband frequency, to produce a combined upper sideband signal, and a combined lower sideband signal;
   b) a first chip matched filter for processing the combined upper sideband signal, and a second chip matched filter for processing the combined lower sideband signal, wherein the chip matched filters are matched to a chip of the spreading code as it appears following downconversion of the signals to the respective upper or lower sideband;
   c) a plurality of channels, one for each received signal of interest, each channel adapted to receive the outputs from the first and second chip matched filters;
   wherein each sideband of each channel comprises at least three gates, comprising of at least an Early, a Prompt, and a Late gate;
   and within each gate there comprises:
   i) a nearest-neighbour sampler for sampling the signal from the chip matched filter, using an Early, Late or Prompt timing reference as appropriate;
   ii) a multiplier for multiplying the samples from (i) with an appropriate part of a local copy of the spreading code, from a spreading code generator;
   iii) a mixer for multiplying the signal within the gate by a feedback loop signal for removal of Doppler frequency or local oscillator offsets present on the sideband, the mixer being driven by a numerically controlled oscillator;
   iv) an integrator for integrating a gate signal produced from steps (i-iii);
   wherein a feedback signal derived from a combination of outputs of the Early and Late gates is used to drive a numerically controlled oscillator which in turn controls the timing of the nearest-neighbour sampler, and the feedback loop signals in (iii) are derived from the outputs of the Prompt gates.

2. A receiver as claimed in claim 1 wherein each chip matched filter processes all the signals of a given sideband simultaneously.

3. A receiver as claimed in claim 1 for each channel, the outputs, from each sideband, of the integrators from the Prompt gates are combined to produce a complex output from which a navigation message is extracted.

4. A receiver as claimed in claim 1 wherein the nearest-neighbour samplers comprise sample selection units arranged to receive sample outputs from the chip matched filter and to select as an output, a sample that is nearest in time to a desired ideal time in relation to a timing reference point.

5. A receiver as claimed in claim 4 wherein the spreading codes comprise of a series of chips, and each sample selection unit provides a single sample output for each chip of the spreading code.

6. A receiver as claimed in claim 5 wherein the number of samples provided to the sample selection unit is arranged to have, on average, a non-integer number of samples per chip.

7. A receiver as claimed in claim 1 wherein, for each channel, the moduli of the Early integrator outputs are summed, and the moduli of the Late integrator outputs are summed, and a signal for driving a code NCO associated with the N-N Sampler and spreading code generator is derived from the equation:

$$\frac{(|E_U|+|E_L|)-(|L_U|+|L_L|)}{(|E_U|+|E_L|)+(|L_U|+|L_L|)}.$$

8. A receiver as claimed in claim 1 wherein, for each channel, a first signal is generated comprising the sum of the arc tangents of the Prompt integrators for each sideband, and a second signal is generated comprising the difference of the arc-tangents of the Prompt integrators for each sideband, the first signal is filtered using a carrier loop filter, and the second signal filtered using a phase difference loop filter, and the sum of the first and second filtered signals is used to drive the carrier NCO on one sideband, and the difference of the first and second filtered signals is used to drive the carrier NCO on the other sideband.

9. A receiver as claimed in claim 1 wherein the plurality of signals of interest are those transmitted by satellites forming a GNSS system.

10. A receiver as claimed in claim 1 wherein the downconversion to baseband in step (a) is not driven by a feedback loop from the channels or gates.

11. A receiver as claimed in claim 1 further comprising an acquisition unit arranged, on each sideband, to split the CMF filtered signal into a plurality of temporal parts, each shorter than a full sequence of the spreading code, and to carry out a sub-correlation with a similar sized part of the local copy of the spreading code, and combining the results of the plurality of sub-correlations in fast Fourier transform or discrete Fourier transform.

12. A method of demodulating a plurality of signals of interest, transmitted by different transmitters and received by an antenna, all occupying the same shared frequency band or bands, and each signal having a separate spreading code applied thereto, and comprising of an upper and lower sideband, the method comprising the steps of:
   a) downconverting each sideband of all the received signals to a nominal baseband frequency, to produce a combined upper sideband signal, and a combined lower sideband signal;
   b) filtering the combined upper sideband signal in a first chip matched filter, and the combined lower sideband signal in a second chip matched filter, wherein the chip matched filters are matched to a chip of the spreading code as it appears following downconversion to the respective upper or lower sideband;
   c) providing the filtered upper and lower sideband signals to each of a plurality of channels, one for each received signal of interest, each of the channels being adapted to process both sidebands separately,
   and wherein each sideband of each channel comprises at least three gates, comprising of at least an Early, a Prompt, and a Late gate;
   and within each gate:
   i) sampling, using a nearest-neighbour sampler, the signal from the chip matched filter, using an Early, Late or Prompt timing reference as appropriate;
   ii) multiplying, using a multiplier, samples from (i) with an appropriate part of a local copy of the spreading code, from a spreading code generator;
   iii) multiplying, using a mixer, the signal within the gate by a feedback loop signal for removal of Doppler frequency or local oscillator offsets present on the sideband, the mixer being driven by a numerically controlled oscillator;
   iv) integrating, using an integrator, a gate signal produced from steps (i-iii);
   wherein a feedback signal derived from a combination of outputs of the Early and Late gates is used to drive a numerically controlled oscillator which in turn controls the timing of the nearest-neighbour sampler, and the feedback loop signals in (iii) are derived from the outputs of the Prompt gates.

13. A non-transitory computer-readable medium storing instructions that, when executed by one or more processors, are configured to cause the one or more processors to perform operations comprising the method of claim 12.

* * * * *